US010137950B2

(12) United States Patent
Reshad et al.

(10) Patent No.: US 10,137,950 B2
(45) Date of Patent: *Nov. 27, 2018

(54) VEHICLE TRACK ASSEMBLY HAVING TAPERED WHEELS

(71) Applicant: ATI, Inc., Mt. Vernon, IN (US)

(72) Inventors: Jamsheed Reshad, Newburgh, IN (US); Duane Tiede, Naperville, IL (US); Kenneth J. Juncker, Mt. Vernon, IN (US)

(73) Assignee: ATI, Inc., Mt. Vernon, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,419

(22) Filed: Feb. 28, 2017

(65) Prior Publication Data

US 2017/0166272 A1 Jun. 15, 2017

Related U.S. Application Data

(63) Continuation of application No. 14/208,834, filed on Mar. 13, 2014, now Pat. No. 9,580,121.

(51) Int. Cl.
*B62D 55/14* (2006.01)
*B62D 55/084* (2006.01)

(52) U.S. Cl.
CPC .......... *B62D 55/14* (2013.01); *B62D 55/084* (2013.01)

(58) Field of Classification Search
CPC ...... B62D 55/08; B62D 55/10; B62D 55/104; B62D 55/14; B62D 55/145; B62D 55/30; B62D 55/305; B62D 55/084
USPC ....... 305/129, 130, 132, 133, 134, 136, 137, 305/139, 140
See application file for complete search history.

(56) References Cited

U.S. PATENT DOCUMENTS 2,809,071 A 10/1957 Kordes
3,606,497 A * 9/1971 Gilles ................ B62D 55/0966
305/194

(Continued)

FOREIGN PATENT DOCUMENTS

JP S6050087 U 4/1985
JP H06298134 A 10/1994

OTHER PUBLICATIONS

Supplemental European Search Report dated Nov. 21, 2017; Ser. No. EP 15 76 1283.

*Primary Examiner* — John D Walters
(74) *Attorney, Agent, or Firm* — Jansson Munger McKinley & Kirby Ltd.

(57) ABSTRACT

A vehicle track module having a frame, the module mountable on a rotatable axle of a vehicle and having a drive wheel rotatably mounted to the frame, leading and trailing idler wheels rotatably mounted to the frame, at least one bogie wheel in contact with the track and positioned between the idler wheels, and a continuous flexible track extending about the wheels, and the at least one bogie wheel is a cylindrical wheel with a tapered elastomeric tire therearound. The track module may include a module center plane parallel to the drive wheel and the bogie wheel may be thicker toward the center plane. A track assembly for a vehicle including a frame for mounting with respect to the vehicle and a plurality of wheels in contact with a continuous flexible track extending about the wheels with at least one wheel being cylindrical and including a tapered elastomeric tire.

31 Claims, 4 Drawing Sheets

(56) References Cited

U.S. PATENT DOCUMENTS

| | | | | |
|---|---|---|---|---|
| 5,005,922 A | * | 4/1991 | Edwards | B62D 55/088 |
| | | | | 305/170 |
| 6,904,986 B2 | * | 6/2005 | Brazier | B62D 49/0635 |
| | | | | 180/9.21 |
| 8,083,297 B2 | * | 12/2011 | Fujita | B62D 55/244 |
| | | | | 305/165 |
| 2009/0178863 A1 | | 7/2009 | Pink | |

* cited by examiner

VEHICLE TRACK ASSEMBLY HAVING TAPERED WHEELS

RELATED APPLICATION

This application is a continuation of patent application Ser. No. 14/208,834, filed Mar. 13, 2014, being issued as U.S. Pat. No. 9,580,121 on Feb. 28, 2017. The contents of the parent application are incorporated herein.

FIELD

The field relates generally to track assemblies for tracked vehicles and, more particularly, to track assemblies for use on crowned roads. In such track assemblies, improved wheel structure spreads the track load distribution toward the center of a track assembly and thereby reduces wear at the outer edges of the track and the wheels.

BACKGROUND

Agricultural vehicles such as tractors, combines and the like are commonly used in agricultural fields for a variety of jobs, and construction vehicles and other large work vehicles are used for many different jobs on a variety of ground surfaces. Typically, these vehicles have large wheels with tires on which the vehicles are supported on the ground. However, for improved traction, vehicle-track module systems or, more broadly, track assemblies are used in place of wheels with tires, and such track modules and track assemblies provide a much larger ground-surface engagement area that spreads vehicle weight and tends to prevent vehicles from becoming bogged down in mud or other soft ground surfaces.

Track assemblies for a vehicle typically include a frame mounted with respect to the vehicle and a plurality of wheels in contact with a continuous flexible track which extends about the plurality of wheels. More specifically, a track module, which is a type of track assembly, for use in modular tracked vehicles typically has a upper drive wheel connectable with respect to a vehicle axle for rotation therewith, a plurality of idler and bogie wheels, and an endless flexible rubber track with a main inner surface and spaced track lugs projecting inwardly therefrom, the track extending around the wheels and being driven by its engagement with the drive wheel. Such drive wheels may be large and may, of course, have circumferentially-spaced drive members engageable with the track lugs.

Use places enormous strain on the mechanics of the track assembly, particularly with respect to the wheels, the flexible track around the wheels, and the lugs on the track. This wear-and-tear on the track is especially pronounced in circumstances where a vehicle with a track assembly is driven on a surface that is not substantially level, a scenario often encountered in both the construction and agricultural fields of use. On crowned roads, for example, the bulk of the weight of the vehicle is not evenly distributed across the entire width of the track. Rather, depending upon the type of crowned road, the vehicle load may be primarily distributed toward the outer edges of the track, which, of course, is not desirable because this will cause premature track wear shortening the useful life of the track.

The term "crowned" describes the cross-sectional shape of a road surface and the term "cross slope" describes the slope of a road surface perpendicular to the centerline of the road. There are several types of crowned roads. For example, a road may have a centerline crown in which case the road slopes down and away on both sides from a road surface center point. A normal crowned road has a small degree of cross slope that would ordinarily be imperceptible to a person driving a vehicle thereon. Crowned roads may, however, have a more significant degree of cross slope. Such a road may look rounded in the middle. In a rounded crowned road, the center of the road may be flat, in which case the road slopes down and away from the center flat portion of the road on both sides. Older rural roads, whether paved or unpaved, typically include some form of a centerline crown. In some instances however, especially seen in narrower roads, a crowned road may slope primarily more toward one side of a road surface than the other. For example, a road may slope toward a down-slope side of a road toward a road shoulder or, conversely, a road may slope down and toward an up-slope side of a road toward a road shoulder.

Track modules and assemblies seen in the prior art are not especially suited for use on crowned roads having variable degrees of cross slope because the wheels themselves on such known vehicle track modules are not generally compliant and, thus, do not accommodate for the slope in the road. Some modules and assemblies may attempt to compensate surface cross slope by including roll axis structure for the wheel shafts. A roll axis allows the wheels to move up and down around an axis substantially parallel to the direction of vehicle motion in response to irregularities in a ground surface. Including a roll degree-of-freedom for a wheel axle adds additional complexity and cost to the structure of the vehicle track module. It also adds additional structure subject to wear and failure and requiring the need for regular maintenance, repair and replacement.

A solution to the problems described above which still retains the advantages of track-assembly technology and which accommodates variability in road-surface cross slope and reduces uneven track wear would be an important advance in the art.

SUMMARY

An improvement in a vehicle track module of the type including a frame where the module is mountable on a rotatable axle of a vehicle is described herein. The vehicle track module has a drive wheel which is rotatably mounted to the frame, leading and trailing idler wheels rotatably mounted to the frame, and at least one bogie wheel positioned between the leading and trailing idler wheels and in contact with a continuous flexible track which extends about the drive wheel, the idler wheels, and the at least one bogie wheel. An improvement is described herein wherein the at least one bogie wheel is a cylindrical wheel with a tapered elastomeric tire therearound. The characteristics of the improved vehicle track module overcome the problems and shortcomings described above.

In describing the improved vehicle track module, the term "taper" used in various forms refers to a characteristic of at least one wheel of the track module which has a circumferential surface that is thicker toward one side than the other side. The term "tire" as used throughout does not impose any material limitation for the tapered tire, but rather, the tapered tire can be made of a variety of suitable materials including, for example, steel, aluminum, rubber, polyurethane, rubber-like materials, nylon, and other material combinations. The term "elastomeric" refers to any natural or synthetic substance having elasticity, for example, rubber, nylon, polypropylene, polyethylene, polyamide, polyester, polycarbonate and polysulphone and other material combinations with appropriate qualities would be acceptable. It should also be noted that the term "flexible track" as used herein means tracks made of any material capable of flexing, including but not limited to natural rubber, synthetic rubber, or any rubber-like material. The term "cylindrical wheel" as used herein refers to a round structure the circumferential surface of which is cylindrical, but which may include a slight mold release draft. The internal configurations of such wheels may include many different types of wheel structures.

In one aspect of the improved vehicle track module, the module includes a module center plane that is parallel to the drive wheel and the bogie wheel tapered tire is thicker toward the center plane. In another embodiment, only a portion of the elastomeric tire circumferential surface is tapered. In a further embodiment, the bogie wheel tapered elastomeric tire is a solid elastomeric tire.

In some preferred embodiments, the vehicle track module includes at least two bogie wheels, each being a cylindrical wheel with a tapered elastomeric tire therearound. The track module may include a module center plane that is parallel to the drive wheel and the bogie wheel tapered elastomeric tires are thicker toward the center plane. In another embodiment, only a portion of the circumferential surface of the bogie wheel elastomeric tires is tapered. In still a further embodiment, the bogie wheels each may include a solid elastomeric tapered tire.

In other preferred embodiments, each of the leading and trailing idler wheels may also be a cylindrical wheel with a tapered elastomeric tire therearound. The module may include a module center plane that is parallel to the drive wheel and the leading and trailing idler wheel tapered elastomeric tires are thicker toward the center plane. In another embodiment, only a portion of the circumferential surface of the leading and trailing idler wheel elastomeric tires is tapered. In still a further embodiment, the leading and trailing idler wheels may include a solid elastomeric tapered tire.

In some embodiments, the vehicle track module further includes a high-idler wheel that is a cylindrical wheel with an elastomeric tire therearound. In a preferred embodiment, the high-idler wheel is a cylindrical wheel with a tapered elastomeric tire therearound. In such embodiment, the track module may include a module center plane parallel to the drive wheel and the high-idler wheel tapered tire is thicker toward the center plane. In another embodiment, only a portion of the circumferential surface of the high-idler wheel tire is tapered. In still a further embodiment, the high-idler wheel may include a solid elastomeric tapered tire.

In still other embodiments, the vehicle track module includes at least one bogie wheel and leading and trailing idler wheels where each such wheel is a cylindrical wheel with a tapered elastomeric tire therearound. And, in further preferred embodiments, the improved vehicle track module includes leading and trailing idler wheels, two bogie wheels, each of which wheels being a cylindrical wheel with a tapered elastomeric tire therearound. And, in yet other highly-preferred embodiments, the improved vehicle track module includes leading and trailing idler wheels, two bogie wheels, and a high-idler wheel, where each of the wheels is a cylindrical wheel with a tapered elastomeric tire therearound.

Yet another aspect of the improved vehicle track module of the type including a frame where the module is mountable on a rotatable axle of a vehicle is described herein. The vehicle track module has a drive wheel which is rotatably mounted to the frame, leading and trailing idler wheels rotatably mounted to the frame, and at least one bogie wheel positioned between the leading and trailing idler wheels and in contact with a continuous flexible track which extends about the drive wheel, the idler wheels, and the at least one bogie wheel. In an embodiment, the at least one bogie wheel is a tapered wheel.

In another preferred embodiment, a track assembly for a vehicle is disclosed. The assembly includes a frame for mounting the assembly with respect to the vehicle. The assembly further includes a plurality of wheels that are in contact with a continuous flexible track which extends about the plurality of wheels and at least one of the plurality of wheels is a cylindrical wheel which includes a tapered elastomeric tire therearound. Such a track assembly may be part of a fully-integrated tracked vehicle.

In an embodiment, the track assembly may include an assembly center plane that is parallel to the plurality of wheels and the tapered tire may be thicker toward the assembly center plane. The tapered elastomeric tire of the track assembly may be a solid elastomeric tire.

In another embodiment, more than one of the plurality of wheels in the track assembly may have a tapered elastomeric tire therearound. In such embodiment, the track assembly may include an assembly center plane that is parallel to the plurality of wheels and the tapered tires may be thicker toward the assembly center plane. In still a further embodiment, a portion of the tapered tire circumferential surface is tapered. In such embodiment, more than one of the plurality of wheels may have a tapered elastomeric tire therearound. Yet in other embodiments, the track assembly may include an assembly center plane that is parallel to the plurality of wheels and the tapered tire may be thicker toward the assembly center plane.

BRIEF DESCRIPTION OF THE DRAWINGS

Exemplary improved vehicle track module including at least one bogie wheel which is a cylindrical wheel with a tapered elastomeric tire therearound may be understood by reference to the following description taken in conjunction with the accompanying drawings, in which like reference numbers identify like elements throughout the different views. The drawings are not necessarily to scale, emphasis instead being placed upon illustrating the principles of the disclosure.

DETAILED DESCRIPTION

Prior track apparatus for vehicles are disclosed in U.S. Pat. No. RE36,284 (Kelderman), U.S. Pat. No. 5,829,848 (Kelderman), U.S. Pat. No. 6,536,854 (Kahle et al.), U.S.

Pat. No. 6,543,861 (Kahle et al.), U.S. Pat. No. 6,543,862 (Kahle et al.) and U.S. Pat. No. 6,557,953 (Kahle et al.), assigned to the assignee of the present invention, and are incorporated herein by reference. The invention is an improvement in the track modules and assemblies of the type referred to in such patents, has application in positive drive systems, friction drive systems, gliding systems (in which power is not transferred to the track from one of the wheels engaging the track) and combination systems.

Figure 1:
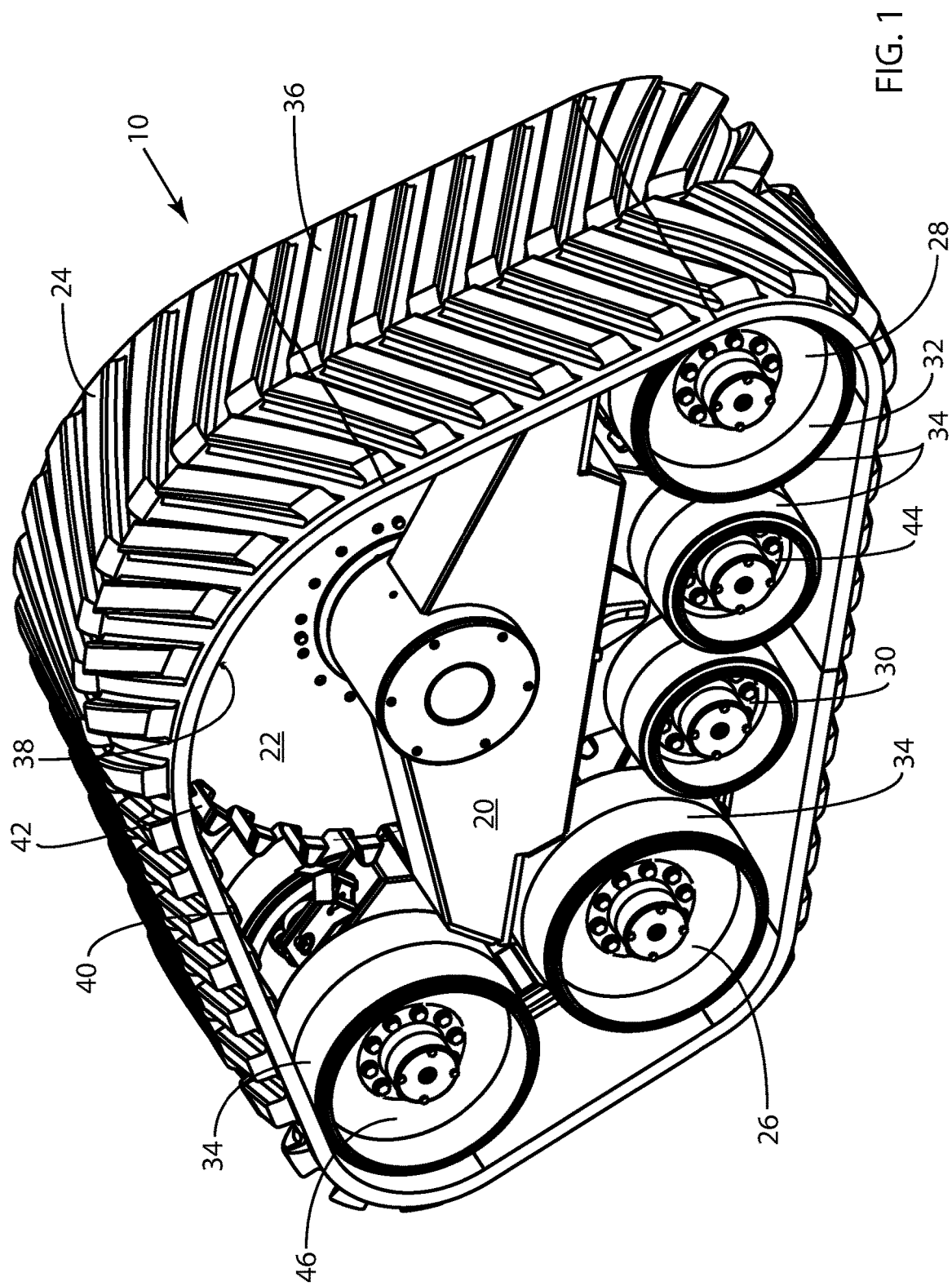
FIG. 1 is a perspective view of an exemplary vehicle track assembly in accordance with the present invention.

Referring first to FIG. 1, an exemplary vehicle track module 10 having a frame 20 is illustrated. Track module 10 is more broadly referred to herein as a track assembly 10. Where a track module may be removably and replaceably used in modular track vehicles, track assemblies may be part of a fully-integrated track vehicle where the assembly is more rigidly attached thereto.

As shown in FIG. 1, track module 10 is mountable on a rotatable axle (not shown) of an agricultural or construction (or other earth-moving) vehicle (not shown) and has a drive wheel 22 that is rotatably mounted to frame 20. Other types of vehicles, such as trucks, automobiles and the like are considered as being within the scope of the present invention.

FIGS. 1-4 illustrate various embodiments of the improved track wheel module 10. As shown in FIG. 1, track module 10 may include a continuous flexible track 24 which extends about a plurality of aligned wheels, which may include, for example, drive wheel 22, leading and trailer idler wheels 26, 28 and at least one bogie wheel 30 which is a tapered wheel. Wheel 32 may be a cylindrical wheel including a tapered elastomeric tire 34 therearound. Wheel 32 may be a metal wheel, for example, or be made of any other suitable material. As is apparent, flexible track 24 is in the form of a continuous loop. Drive wheel 22 is mountable to an axle of a vehicle for rotational movement therewith in order to drive flexible track 22, and thus the vehicle.

The track module is one type of a track assembly. In all track assemblies having continuous flexible tracks, there is a plurality of wheels in contact with such tracks and the tracks extend about the plurality of wheels, and at least one of the wheels is a cylindrical wheel which includes a tapered elastomeric tire. While a track module may be used to replace existing modules on existing modular-type track vehicles, a track assembly may be part of a fully-integrated track vehicle. In the case of both the modules and track assemblies integrated with vehicles, at least one of the plurality of wheels is a cylindrical wheel which includes a tapered elastomeric tire therearound as described herein.

Still referring to FIG. 1, flexible track 24 includes an outer ground-engaging surface 36 and an inner wheel-engaging surface 38 having inwardly-projecting wheel-engaging lugs 40, which are circumferentially spaced about inner surface 38 of track 24. Drive wheel 22 is engaged with inner surface 38 of continuous flexible track 24, including lugs 40 thereon. FIG. 1 shows that the outer surface of drive wheel 22 may include circumferentially spaced drive members 42 (such as teeth, drive or sprocket pins or the like) which project radially therefrom. Engagement of lugs 40 with lug-engagement surfaces of drive wheel 22 tends to minimize shearing forces on lugs 40 and the possible turning and twisting of such lugs.

Flexible track 24 is positioned over drive wheel 22 such that lugs 40 projecting from inner surface 38 of track 24 are received between corresponding pairs of drive members 42 projecting from the outer surface of drive wheel 22. Leading and trailing idler wheels 26, 28 are engaged with track 24 and lugs 40 projecting from inner wheel-engaging surface 38 of track 24. The outer surfaces of idler wheels 26, 28 engage inner surface 38 of flexible track 24, including lugs 40. At least one bogie wheel 30 rides over track 24. As shown in FIG. 1, in addition to bogie wheel 30, track module 10 may also include a second bogie wheel 44 and a high-idler wheel 46. High-idler wheel 46 is useful in circumstances where the vehicle must navigate obstructions and other surface irregularities. Track module 10 including high-idler wheel 46 has a high-approach angle which allows the track module to climb over most obstacles, as well as to keep endless track 24 tension consistent, thereby extending track 24 life. If track 24 tension is more consistent, this translates into a more consistent load everywhere across track 24, which means less wear on idler wheels 26, 28. Where high-idler wheel 46 is included in a track module, ground surface debris is pulled under the track keeping the module and machine on top which further improves floatation and minimizes surface damage. The present improvement in vehicle track module is applicable to, of course, standard track modules which do not include high-idler wheel 46 and which instead have a flat track footprint.

Referring still to FIG. 1, in an embodiment, each of idler wheels 26, 28, bogie wheels 30, 44, and high-idler wheel 46 of vehicle track module 10 is a tapered wheel. Such tapered wheels may consist of metal, rubber or rubber-like materials, or any other suitable material, and combinations thereof. Such wheels may include a cylindrical wheel 32 with a tapered elastomeric tire therearound 34. Cylindrical wheel 32 may be a metal wheel, for example, or it may be made of any other suitable materials. Alternatively, improved vehicle track module 10 may include idler wheels 26, 28, and bogie wheels 30, 44 where only bogie wheels 30, 44 are tapered, including by having a tapered elastomeric tire 34 therearound. It is also possible that in addition to one or more of the bogie wheels being tapered, leading and trailing idler wheels 26 and 28 may also be tapered, including by having a tapered elastomeric tire 34 therearound. A still further possibility, as illustrated in FIG. 1, is that each of one or more bogie wheels, 30 and 44, leading and trailing idler wheels, 26 and 28, and high-idler wheel 46 is tapered, including by having a tapered elastomeric tire 34 therearound. It can be seen from the foregoing description that any number or all of the plurality of aligned wheels of improved track module 10 can be tapered, including by having a tapered elastomeric tire 34 therearound.

In many track modules, bogie wheels and idler wheels are paired with another similar wheel on the same axis, and often each pair of wheels is on the same axle. Only one side of track module 10 is shown in FIG. 1, and each wheel shown (26, 28, 30, 44 and 46) is paired with a similar wheel on the other side of track module 10. In FIG. 1, each of these ten wheels is a tapered wheel as described above.

Figure 2:
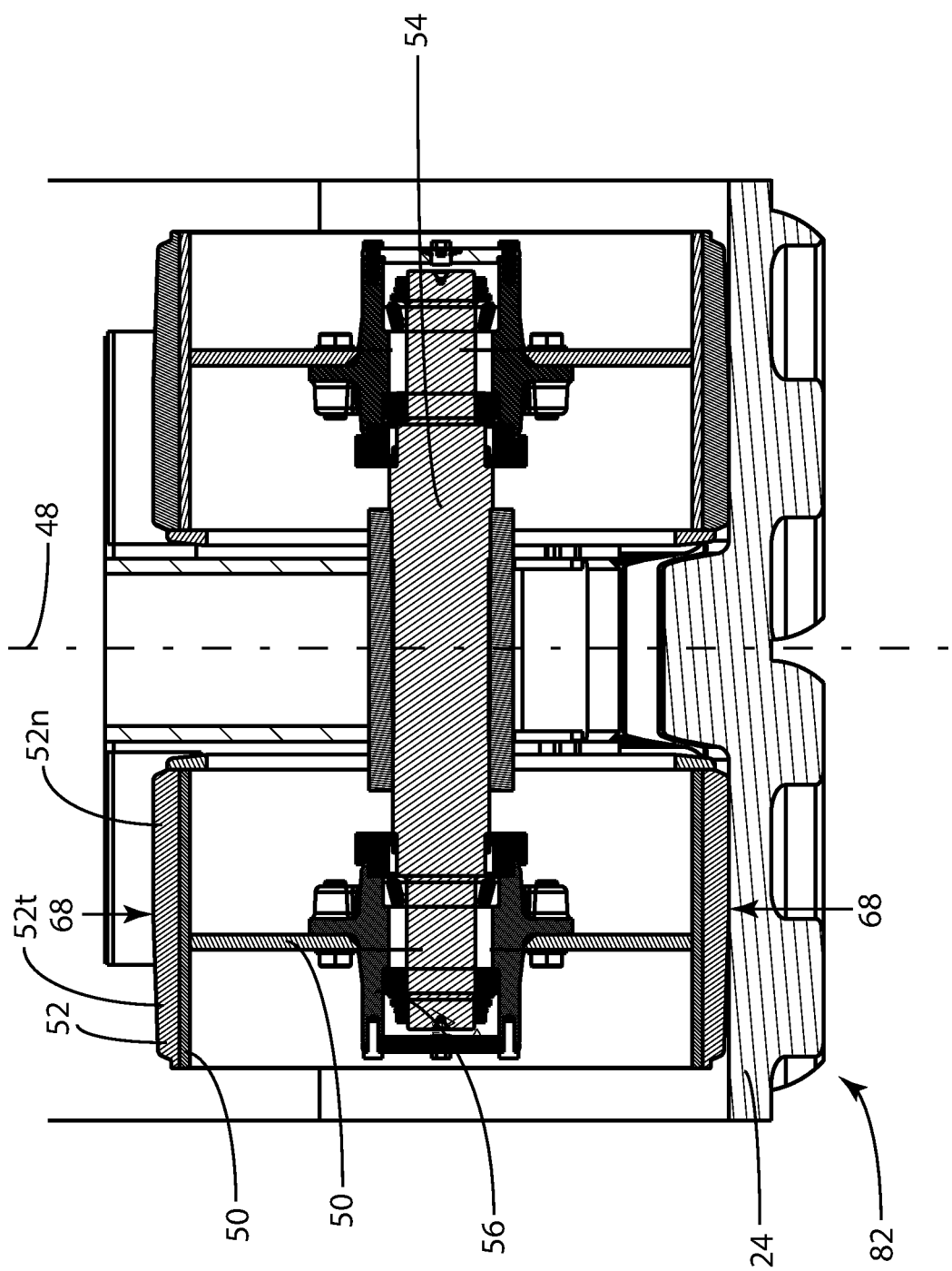
FIG. 2 is a cross-section of a preferred vehicle track module leading idler wheel wherein the elastomeric tire is fully tapered.

In a highly-preferred embodiment, as seen in FIG. 2, track module 10 includes a module center plane 48 that is parallel to drive wheel 22 and the at least one bogie wheel 30 is thicker toward center plane 48. (Center plane 48 is a plane perpendicular to the plane of the drawing and which intersects the dotted line indicated with reference number 48. More broadly, center plane 48 is also referred to as assembly center plane 48.) In embodiments where leading and trailing idler wheels 26, 28 are also tapered, such wheels are thicker toward center plane 48. And, where high-idler wheel 46 is also a tapered wheel, such wheel is thicker toward center plane 48. The cross slope or angle of the taper in the wheels of vehicle track module 10 can be adjusted as needed to optimize the distribution of the vehicle load across the track and to accommodate the type of road conditions the vehicle is expected to encounter.

FIG. 2 shows an exemplary leading idler wheel 26 illustrating the taper described above. It can be seen that idler wheel 26 has a cylindrical wheel 50 with a tapered elastomeric tire 52 therearound. Module center plane 48 is parallel to drive wheel 22 and idler tire 52 is thicker toward center plane 48. Tapered idler wheel 26 shown in FIG. 2 illustrates generally an example of the type of taper which may be included in any one of the wheels of track module 10. Also shown in FIG. 2, idler wheel 26 has a wheel axle 54 and a bearing assembly 56. In FIG. 2, a portion 52t of the elastomeric tire 52 of idler wheel 26 is tapered, but it should be noted that the entire tire may be tapered. The boundary between tapered portion 52t and a non-tapered portion 52n is indicated by a mold parting line 68 (two arrows top and bottom to indicate the line). It should be understood that while non-tapered portion 52n is not tapered, it may not be a perfect cylinder depending on how it is manufactured. For example, if molded it will include a slight mold release draft.

Figure 3:
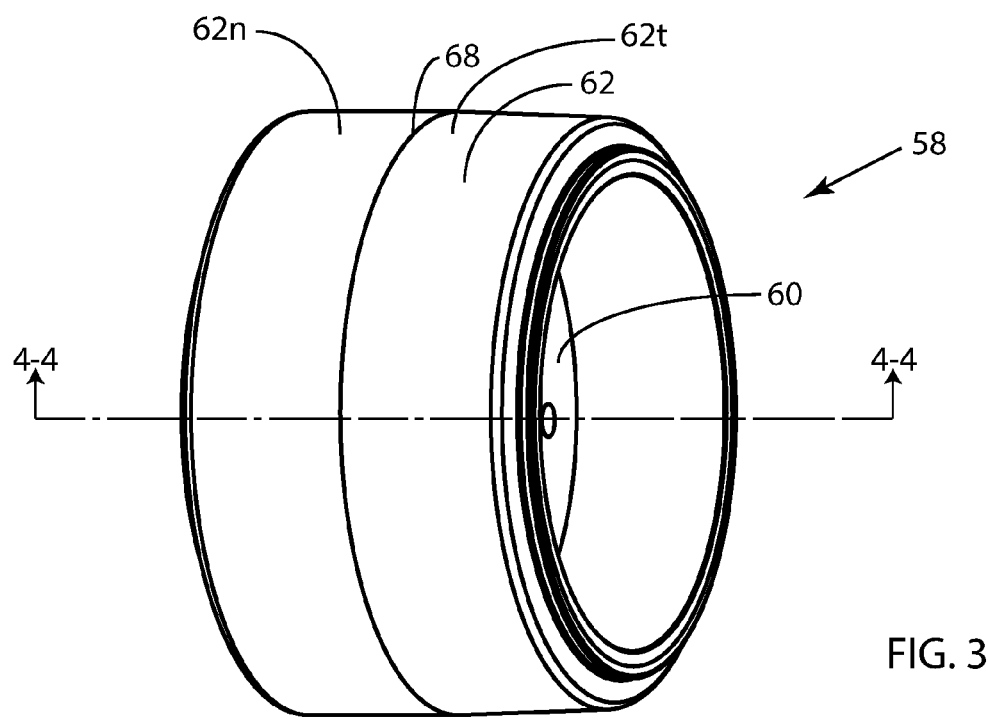
FIG. 3 is a perspective view of an exemplary vehicle track module wheel showing an elastomeric tire tapered portion defined at a mold parting line in the tire.

FIG. 3 is a generic exemplary vehicle track module wheel 58 having a cylindrical wheel 60 and a tapered elastomeric tire 62 therearound. Tire 62 includes a tapered portion 62t and a non-tapered portion 62n, tapered and non-tapered portions 62t and 62n being defined at a mold parting line 68 in tire 62. As with non-tapered portion 52n, it should be understood that while non-tapered portion 62n is not tapered, it may not be a perfect cylinder depending upon how it is manufactured. If, for example, it is molded then non-tapered portion 62n may include a slight mold release draft. As best shown in FIGS. 1 and 3, in embodiments, leading and trailing idler wheels 26 and 28, bogie wheels 30 and 44, and high-idler wheel 46 each include such a mold parting line 68 which is a product of the molds used in the manufacturing process and may not actually be visible on the tires. Tapered and non-tapered portions 62t and 62n can be defined in a tire in any suitable manner, and the transition from non-tapered portion 62n to tapered portion 62t need not be demarcated with such a mold parting line. In FIG. 3, approximately half of tire 62 is tapered, though the taper may be complete, as noted, or it could be something greater or less than half.

Figure 4:
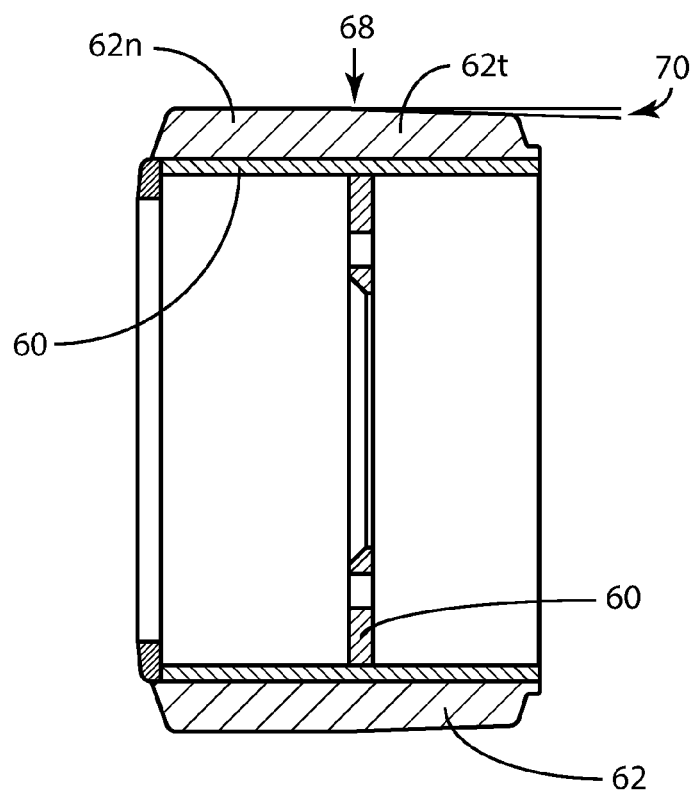
FIG. 4 is a cross-section of the exemplary vehicle track module wheel of FIG. 3 taken along section 4-4 showing a tapered portion of the elastomeric tire circumferential surface defined by a mold parting line in the tire.

The degree of taper in any of the wheels can be adjusted to optimize vehicle use over various types of ground surfaces. The degree of taper between non-tapered tire portion 62n and tapered tire portion 62t is illustrated in FIG. 4 as an angle of taper 70. For example, where a vehicle travels over a typical paved crowned road, the taper may be approximately one and a half degrees to about approximately two and a half degrees. FIG. 4 is a cross-section of the wheel of FIG. 3 along section line 4-4. FIG. 4 shows the cylindrical wheel 60 and tapered elastomeric tire 62 therearound. In FIG. 4, it can be seen that tire 62 tapers, that is, it is more narrow, from about the midpoint of tire 62 away from center plane 48 and is thicker from about the midpoint of tire 62 toward center plane 48.

Figure 5:
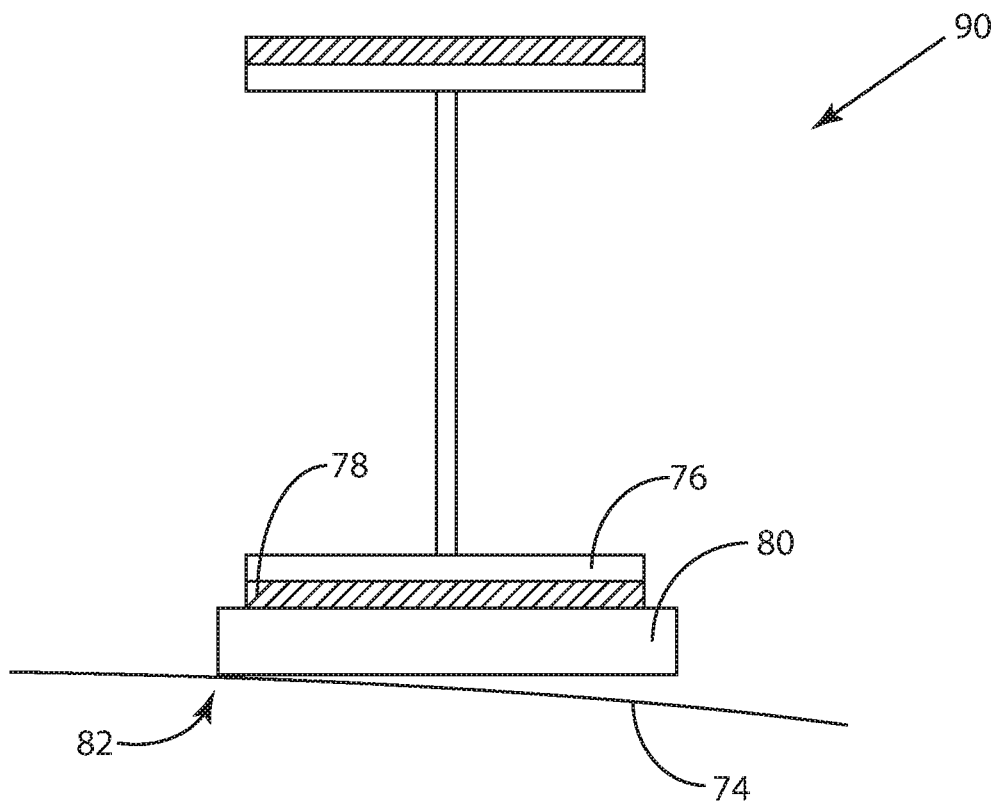
FIG. 5 is a highly-schematic diagram showing a crowned road and a track module non-tapered wheel thereon, where substantially the entire load of the track is at the intersection of the crowned road and the lower left-most corner of the track.

Referring next to FIG. 5, a highly-schematic diagram showing a crowned road 74 and a track module non-tapered wheel 90 is shown. Wheel 90 includes a cylindrical wheel 76 and a non-tapered elastomeric tire 78 therearound engaging the track 80. It can be seen here that substantially the entire load of the track is located at the intersection 82 of the crowned road 74 and the lower left-most corner of track 80. In contrast, referring to FIG. 2 which illustrates leading idler wheel 26 having tapered elastomeric tire 52, an intersection 82 between track 24 and the ground can also be seen. A non-tapered tire on a crowned road increases the pressure between the outside of the tire and the ground. An improved vehicle track module including at least one wheel of the type illustrated in FIGS. 1-4 having a taper avoids this undesirable situation by spreading the load over the width of the track under the tire and the ground thereunder, thus preventing a track module from running on its outer edges. When the wheel load is spread over an wider area toward the center of the track, wear on the edges of the wheels and the track is reduced, and the useful life of the wheels and the track is increased. Moreover, by utilizing a tapered wheel of the types described and shown herein, additional roll-axis structure becomes obsolete thus eliminating additional costs associated therewith, including costs related to the manufacture, repair and replacement of such unnecessary structure.

One skilled in the art will recognize, however, that the disclosure may be practiced without one or more of the specific details, or with other components, materials, and the like. In other instances, well-known structures, materials, or operations are not shown or described in detail to avoid obscuring aspects of the disclosure.

Reference throughout this specification to "the embodiment," "this embodiment," "one embodiment," "an embodiment," "a preferred embodiment" "another preferred embodiment," "an exemplary embodiment," "example," or similar language means that a particular feature, structure, or characteristic described in connection with the embodiment is included in at least one embodiment. Thus, appearances of the phrases "in the embodiment," "in this embodiment," "in one embodiment," "in an embodiment," "in a preferred embodiment," "in another preferred embodiment," "in an exemplary embodiment," "in the exemplary embodiment," "in an example," "in the example" and similar language throughout this specification may, but do not necessarily, all refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments.

While the present disclosure has been described in connection with certain exemplary or specific embodiments, it should be understood that the disclosure is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the disclosure.

What is claimed is:

1. In a vehicle track module mountable on a rotatable axle of a vehicle, the track module having a frame, a drive wheel rotatably mounted to the frame, leading and trailing idler wheels rotatably mounted to the frame, and at least one bogie wheel positioned between the leading and trailing idler wheels and in contact with a continuous flexible track extending about the drive wheel, the idler wheels and the at least one bogie wheel, the improvement wherein the at least one bogie wheel is a cylindrical wheel with an elastomeric tire therearound configured to give the wheel an elastomeric circumferential surface that is cross-sectionally tapered in a direction across the wheel such that the tapered circumferential surface has substantially full-width wheel contact with the track despite usage on crowned roads.

2. The track module of claim 1 further including a module center plane parallel to the drive wheel and wherein the bogie wheel tire is thicker toward the center plane.

3. The track module of claim 1 wherein the bogie wheel tapered elastomeric tire is a solid elastomeric tire.

4. The track module of claim 1 wherein a portion of the bogie wheel elastomeric circumferential surface is tapered.

5. The track module of claim 1 including two bogie wheels each of which is a cylindrical wheel with an elastomeric tire therearound having a tapered circumferential surface.

6. The track module of claim 5 further including a module center plane parallel to the drive wheel and wherein each of the bogie wheel tires is thicker toward the center plane.

7. The track module of claim 6 wherein each of the elastomeric tires is a solid elastomeric tire.

8. The track module of claim 5 wherein a portion of each of the bogie wheel elastomeric circumferential surfaces is tapered.

9. The track module of claim 1 wherein the leading and trailing idler wheels are each a cylindrical wheel with an elastomeric tire therearound having a tapered circumferential surface.

10. The track module of claim 9 further including a module center plane parallel to the drive wheel and wherein the elastomeric tires of the leading and trailing idler wheels are thicker toward the center plane.

11. The track module of claim 9 wherein each of the leading and trailing idler-wheel tires is a solid elastomeric tire.

12. The track module of claim 9 wherein a portion of each of the leading and trailing idler wheel elastomeric circumferential surfaces is tapered.

13. The track module of claim 9 further including a high-idler wheel which is a cylindrical wheel with an elastomeric tire therearound having a tapered circumferential surface.

14. The track module of claim 13 wherein the high-idler wheel tire is a solid elastomeric tire.

15. The track module of claim 13 further including a module center plane parallel to the drive wheel and wherein the high-idler wheel tire is thicker toward the center plane.

16. The track module of claim 13 wherein a portion of the high-idler wheel elastomeric circumferential surface is tapered.

17. The track module of claim 16 wherein the high-idler wheel tire is a solid elastomeric tire.

18. The track module of claim 1 wherein the taper is at an angle of from about one and a half degrees to about two and a half degrees from a horizontal centerline.

19. The track module of claim 18 wherein the bogie wheel tire is a solid elastomeric tire.

20. The track module of claim 19 wherein a portion of the elastomeric tire circumferential surface is tapered.

21. In a vehicle track module mountable on a rotatable axle of a vehicle, the track module having a frame, a drive wheel rotatably mounted to the frame, leading and trailing idler wheels rotatably mounted to the frame, and at least one bogie wheel positioned between the leading and trailing idler wheels and in contact with a continuous flexible track extending about the drive wheel, the idler wheels and the at least one bogie wheel, the improvement wherein the at least one bogie wheel has a circumferential surface which is cross-sectionally tapered in a direction across the wheel, the tapered circumferential surface being configured to spread the load by substantially full-width wheel contact with the track even with usage on crowned roads.

22. A track assembly for a vehicle, including a frame for mounting with respect to the vehicle and a plurality of wheels in contact with a continuous flexible track extending about the plurality of wheels with at least one wheel being a cylindrical wheel which includes an elastomeric tire therearound configured to give the wheel an elastomeric circumferential surface that is cross-sectionally tapered in a direction across the wheel such that the tapered circumferential surface has substantially full-width wheel contact with the track for spreading the load over substantially the entire width of the track under such wheel.

23. The track assembly of claim 22 further including an assembly center plane parallel to the plurality of wheels and wherein the tire with a tapered circumferential surface is thicker toward the assembly center plane.

24. The track assembly of claim 22 wherein the tapered elastomeric tire is a solid elastomeric tire.

25. The track assembly of claim 22 wherein more than one of the plurality of wheels has an elastomeric tire therearound with a tapered circumferential surface.

26. The track assembly of claim 25 further including an assembly center plane parallel to the plurality of wheels and wherein the plural tires with tapered circumferential surfaces are each thicker toward the assembly center plane.

27. The track module of claim 22 wherein the tire with the tapered circumferential surface is tapered across a portion of the width of the circumferential surface.

28. The track assembly of claim 27 wherein more than one of the plurality of wheels has an elastomeric tire therearound with a tapered circumferential surface, the tapering being across a portion of the width of the circumferential surface.

29. The track assembly of claim 22 further including an assembly center plane parallel to the plurality of wheels and wherein the taper is at an angle of from about one and a half degrees to about two and a half degrees from a horizontal centerline and the tire is thicker toward the assembly center plane.

30. The track assembly of claim 29 wherein the tire with the tapered circumferential surface is tapered across a portion of the width of the circumferential surface.

31. In a vehicle track module having a frame, the module mountable on a rotatable axle of a vehicle and having a drive wheel rotatably mounted to the frame, leading and trailing idler wheels rotatably mounted to the frame, at least one bogie wheel positioned between the leading and trailing idler wheels and the at least one bogie wheel, wherein each of the wheels is free of any roll-axis structure, the improvement wherein the at least one bogie wheel is a cylindrical wheel with an elastomeric tire therearound configured to give the wheel an elastomeric circumferential surface that is cross-sectionally tapered in a direction across the wheel.

* * * * *